(12) United States Patent
Yu et al.

(10) Patent No.: US 9,313,841 B2
(45) Date of Patent: Apr. 12, 2016

(54) LED CURRENT BALANCE APPARATUS

(71) Applicant: GREEN SOLUTION TECHNOLOGY, New Taipei (TW)

(72) Inventors: Chung-Che Yu, New Taipei (TW); Shian-Sung Shiu, New Taipei (TW); Chia-Ming Chan, New Taipei (TW); Li-Min Lee, New Taipei (TW)

(73) Assignee: GREEN SOLUTION TECHNOLOGY CO., LTD., New Taipei (TW)

( * ) Notice: Subject to any disclaimer, the term of this patent is extended or adjusted under 35 U.S.C. 154(b) by 557 days.

(21) Appl. No.: 13/672,350

(22) Filed: Nov. 8, 2012

(65) Prior Publication Data
US 2013/0119867 A1 May 16, 2013

(30) Foreign Application Priority Data

Nov. 15, 2011 (TW) .................................. 100141500
May 15, 2012 (TW) .................................. 101117167

(51) Int. Cl.
*H05B 37/00* (2006.01)
*H05B 33/08* (2006.01)

(52) U.S. Cl.
CPC ........ *H05B 33/0815* (2013.01); *H05B 33/0827* (2013.01); *Y02B 20/347* (2013.01)

(58) Field of Classification Search
CPC .............. H02M 3/157; H05B 33/0815; H05B 33/0818; H05B 33/0827; H05B 33/0824; H05B 33/0848; H05B 33/086; H05B 39/04; H05B 41/16; H05B 41/24; H05B 41/2821; H05B 41/2827; H05B 41/3927; H05B 41/2824
See application file for complete search history.

(56) References Cited

U.S. PATENT DOCUMENTS

2003/0025120 A1  2/2003  Chang
2010/0253665 A1  10/2010 Choi et al.

FOREIGN PATENT DOCUMENTS

| CN | 1537403 A   | 10/2004 |
|----|-------------|---------|
| CN | 201386941 Y | 1/2010  |
| CN | 101772233 A | 7/2010  |
| EP | 2237645 A1  | 10/2010 |

*Primary Examiner* — Douglas W Owens
*Assistant Examiner* — Monica C King
(74) *Attorney, Agent, or Firm* — Muncy, Geissler, Olds & Lowe PC

(57) ABSTRACT

The present invention provides an LED current balance apparatus, which utilities capacitances coupled to secondary windings of a transformer to store voltage differences between LED strings. Thereby, the driving voltages applied to LED strings are respectively modulated to make the LED strings flowing through a same driving current. A current regulating apparatus is coupled to all LED strings to stabilize total current of the LED strings at a predetermined current.

14 Claims, 2 Drawing Sheets

US 9,313,841 B2

LED CURRENT BALANCE APPARATUS

BACKGROUND OF THE INVENTION (1) Field of the Invention

The present invention relates to an LED current balance apparatus, and more particularly relates to an LED current balance apparatus with current-balancing capacitive unit.

(2) Description of the Prior Art

Due to process errors of light emitting diodes (LEDs), forward voltages of the LEDs are different. Especially, LED strings with a plural LEDs connected in series have serious voltage difference of total forward voltages. Therefore, when a plural LED strings are driven by the same voltage source, the voltage difference of total forward voltages have to be compensated for balancing LED currents.

FIG. 1 is a detailed circuit diagram of a current balancing apparatus provided by Samsung Electronics Co., Ltd. A switching mode power supply comprises two switches S1 and S2, a capacitor Ca, a transformer, diodes D1-D12, balancing capacitors Cb1, Cb2 and Cb3, and capacitors C1-C6. The switching mode power supply converts an input current into an alternating current, which is rectified by the diodes D1-D12 and filtered by the capacitors C1-C6 to light LEDs Ld1-Ld6. The transformer has a primary coil L1 and three secondary coils L21, L22, L23, and the balancing capacitors Cb1, Cb2, Cb3 are coupled to corresponding secondary coils L21, L22, L23 for compensating impedance differences of two LEDS of respective secondary coils. An impedance value of a capacitor is determined by operating frequency and capacitance. The impedance values of the balancing capacitors Cb1, Cb2 and Cb3 in the current balancing apparatus is set to be much higher than the impedance values of the LEDs Ld1-Ld6, i.e., an impedance value seen by the balancing capacitor looking toward the diode is negligible compared to an impedance value of the balancing capacitor. Therefore, the same DC current is applied to the LEDs Ld1-Ld6, and so the current balancing of the LEDs Ld1-Ld6 is accomplished.

However, the LED driving system still has some problems. Firstly, the currents of the LEDs Ld1-Ld6 cannot be stabilized at an excepted current value. It results from that the balancing capacitors Cb1, Cb2 and Cb3 have tolerances in capacitance and vary in capacitance with temperature. Moreover, the actual operating frequency of the current balancing apparatus may not be a preset frequency and so affects the amount of the current of the LEDs Ld1-Ld6. Secondly, the currents of the secondary coils of the transformer are sine waves before being rectified and so the amplitudes of the currents are periodically varied in response to the switching of the switches S1 and S2. Even after the currents are rectified by the capacitors C1-C6, the currents provided by the secondary coils L21, L22, L23 to the flowing through the LEDs Ld1-Ld6 still have large current ripples due to the LEDs Ld1-Ld6 with an end grounded having low impedance values. Thirdly, the LEDs Ld1-Ld6 can be dimmed by cutting off the switches S1 and S2 to stop a power conversion of the switching mode power supply. However, when cutting off the switches S1 and S2, the LEDs Ld1-Ld6 still lights for a certain time period due to the energy stored in the transformer, the balancing capacitors Cb1, Cb2 and Cb3, and the capacitors C1-C6, and then stops lighting. Furthermore, during the certain time period, the currents of the LEDs Ld1-Ld6 are decreased with time, which cause color shift. When the switches S1 and S2 are conducted again, the LEDs Ld1-Ld6 begin to light after a certain time period of recovering the stored energy of the transformer, the balancing capacitors Cb1, Cb2 and Cb3, and the capacitors C1-C6. Similarly, during the certain time period, the currents of the LEDs Ld1-Ld6 are increased with time, which still cause color shift. Thus, this type of the LED driving system has problems of inaccuracy dimming control and color shift.

SUMMARY OF THE INVENTION

In view of the problems of inaccurate LED current, current ripple and color shift in the conventional arts, the LED current balance apparatus of the present invention uses a current regulating apparatus to stabilize the total current of LED units to make every LED units to be stabilized at an except current value.

To accomplish the aforementioned and other objects, an exemplary embodiment of the invention provides an LED current balance apparatus, comprising a transformer, two rectifying energy-storage circuits, at least one capacitive unit and a current regulating apparatus. The transformer has a primary winding and a secondary winding, wherein two terminals of the secondary winding are respectively coupled to an LED unit to drive the LED unit lighting. The rectifying energy-storage circuits are respectively coupled to corresponding LED units. Every rectifying energy-storage circuit comprises a rectifying unit and an energy-storage unit. The rectifying unit is coupled to a corresponding terminal of the secondary winding for rectifying an electric power supplied by the secondary winding. The energy-storage unit is coupled to the rectifying unit for storing the rectified electric power. The least one capacitive unit is coupled to a corresponding terminal of the secondary winding for storing a bias voltage. The current regulating apparatus has a common node to be coupled to the LED units and stabilizes a sum of currents flowing through the LED units at a predetermined current.

It is to be understood that both the foregoing general description and the following detailed description are exemplary, and are intended to provide further explanation of the invention as claimed. In order to make the features and the advantages of the invention comprehensible, exemplary embodiments accompanied with figures are described in detail below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
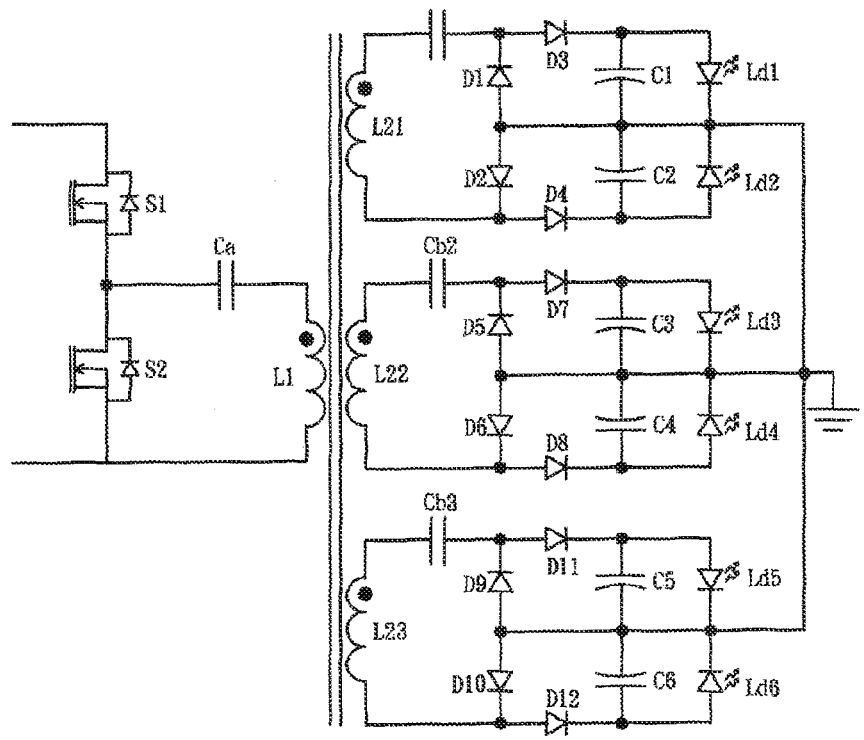
FIG. 1 is a detailed circuit diagram of a current balancing apparatus provided by Samsung Electronics Co., Ltd.
Figure 2:
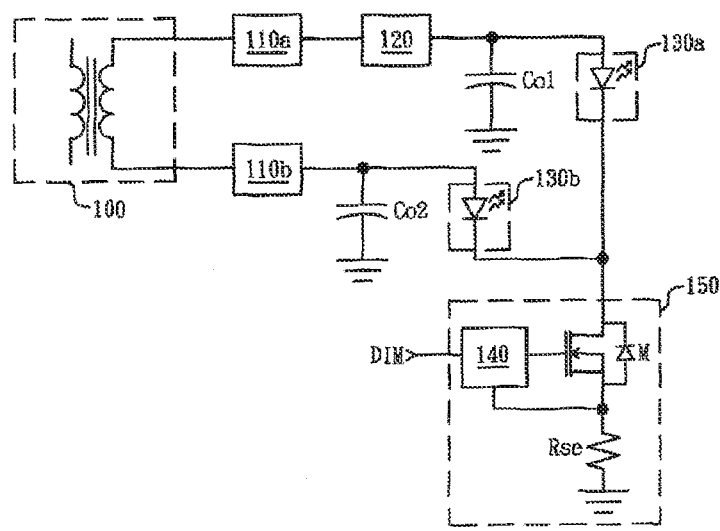
FIG. 2 is schematic diagram of an LED current balance apparatus according to a first preferred embodiment of the present invention.

FIG. 2 is schematic diagram of an LED current balance apparatus according to a first preferred embodiment of the present invention. The LED current balance apparatus comprises a switching mode converter circuit 100, two rectifying energy-storage circuits, a capacitive unit 120 and a current regulating apparatus 150, for lighting two LED units 130a and 130b. The switching mode converter circuit 100 comprises a transformer, which converts an input electric power received by a primary winding into an alternating current electric power at a secondary winding. The two rectifying energy-storage circuits respectively comprise a rectifying unit 110a and an energy-storage unit Co1, and a rectifying unit 110b and an energy-storage unit Co2, correspondingly coupled to two terminals of the secondary winding to rectify and store the alternating current electric power provided by the secondary winding. The capacitive unit 120 is coupled in series to one terminal of the secondary winding. With the switching of the switching mode converter circuit 100, current difference between the LED units 130a and 130b causes the capacitive unit 120 to be charged till it reaches a bias voltage of the capacitive unit 120 that makes the currents of the LED units 130a and 130b to be equal. Hence, the bias voltage stored in the capacitive unit 120 is in response to the driving voltage difference between the LED units 130a and 130b when flowing through the same driving current. The current regulating apparatus 150 has a common node coupled to the LED units 130a and 130b for stabilizing a sum of the currents of the LED units 130a and 130b at a predetermined current.

The capacitive unit 120 is capable of compensating the driving voltage difference of the LED units 130a and 130b with the same driving current. The sum of the currents of the LED units 130a and 130b is stabilized at the predetermined current; even the current of the secondary winding of the transformer periodically varies. Especially, in the conventional arts, the LED driving system under fixed driving power changes impedance of the LED units when any LED in the LED units is short-circuited or open-circuited. It occurs the current value of the LED units to be changed and further color shift. The current regulating apparatus 150 of the present invention could ensure that the currents of the LED units 130a and 130b are still stabilized to avoid color shift.

The current regulating apparatus 150 comprises a transistor M and a current regulating controller 140. The transistor M is coupled to the two LED units 130a and 130b. A resistor Rse is coupled to the transistor M to detect a current flowing through the transistor M. The current regulating apparatus 150 regulates a state of the transistor M according to the detected result of the resistor Rse for stabilizing the current flowing through the transistor M at the predetermined current. The current regulating apparatus 150 may further receive a dimming signal DIM to accordingly control the transistor M to be turned on and off. When the transistor M is turned on, the current flowing through the transistor M is stabilized at the predetermined current. When the transistor M is turned off, the current flowing through the transistor M is zero. Furthermore, when the transistor M is turned off, there is no current loop to conduct the currents of the LED units 130a and 130b and so the LED units 130a and 130b immediately stop lighting. Thereby, the energy stored in the energy-storage units Co1 and Co2, the capacitive unit 120 and the transformer could be held. When the transistor M is just turned on again, the currents flowing through the LED units 130a and 130b are immediately stabilized because the energy stored in the energy-storage units Co1 and Co2, the capacitive unit 120 and the transformer are almost saved during the duration of the transistor M turned off. Hence, the LED current balance apparatus of the present invention has the advantages of accurately dimming and color-shift free.

Figure 3:
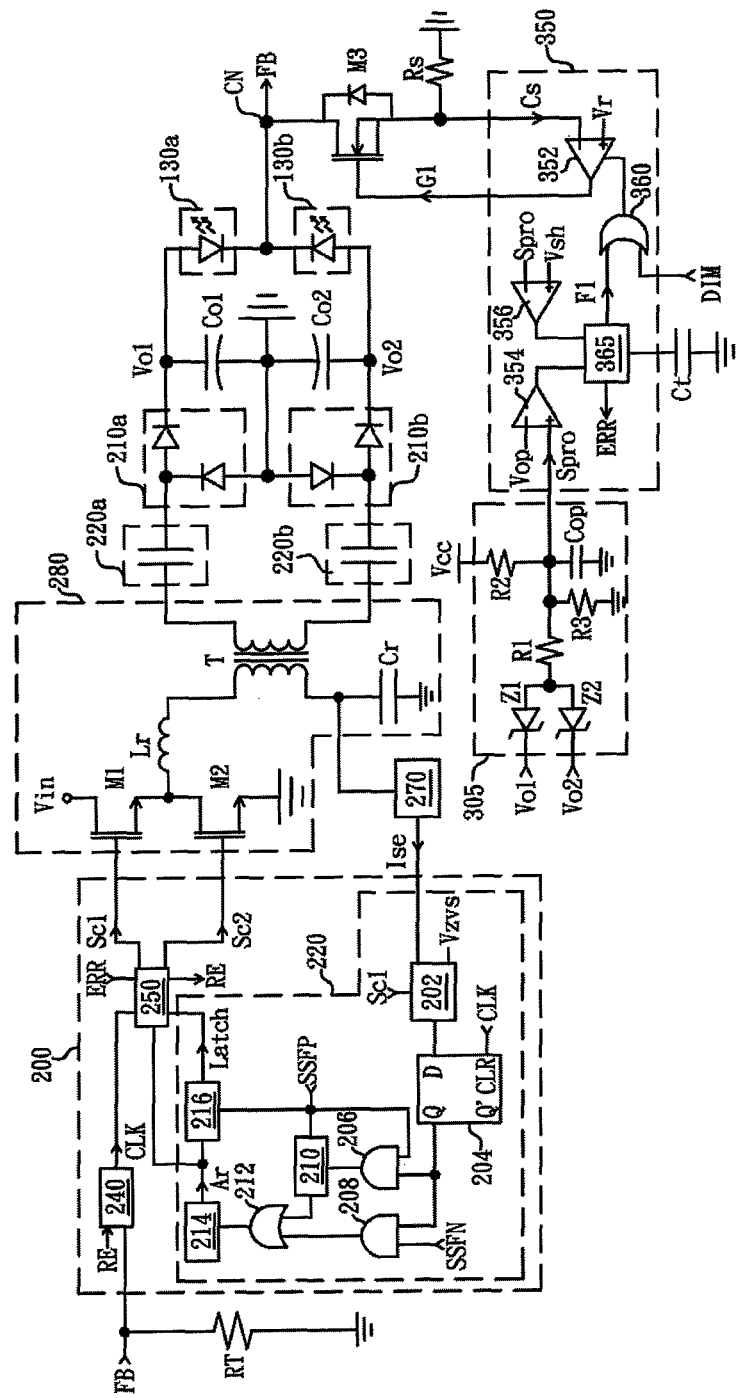
FIG. 3 is schematic diagram of an LED current balance apparatus according to a second preferred embodiment of the present invention.

FIG. 3 is schematic diagram of an LED current balance apparatus according to a second preferred embodiment of the present invention. In the present embodiment, the switching mode converter circuit is an LLC resonant converter circuit. The LLC resonant converter circuit comprises an LLC converting controller 200, a current detecting circuit 270 and a resonant circuit 280. The resonant circuit 280 has a primary side and a secondary side. The primary side comprises transistor switches M1 and M2, a primary winding of a transformer T, a resonant capacitance Cr and a resonant inductance Lr. The secondary side comprises a secondary winding of the transformer T, rectifying units 210a and 210b, two capacitive units 220a and 220b and energy-storage units Co1 and Co2. The primary side of the resonant circuit 280 is coupled to an input power source Vin to transmit an electric power supplied by the input power source Vin to the secondary winding. The rectifying unit 210a, the capacitive unit 220a and the energy-storage unit Co1 are coupled to one terminal of the secondary winding, and the rectifying unit 210b, the capacitive unit 220b and the energy-storage unit Co2 are coupled to the other terminal of the secondary winding, for rectifying and filtering an electric power output by the secondary winding. With the switching of the LLC converting controller 200, current difference between the LED units 130a and 130b causes the capacitive units 220a and 220b to be charged till they reach a bias voltages between the capacitive unit 220a and 220b that make the currents of the LED units 130a and 130b to be equal. Hence, bias voltages stored in the capacitive unit 220a and 220b are in response to the driving voltage difference between the LED units 130a and 130b when flowing through the same driving current. Thereby, the output voltages Vo1, Vo2 are respectively provided to light the LED units 130a and 130b. The current detecting circuit 270 is coupled to a primary side of the resonant circuit 280 to detect a resonant current flowing through the primary side of the resonant circuit 280 and accordingly generates a current detecting signal Ise.

A current regulating apparatus comprises a transistor M3 and a current regulating controller 350. An end of the transistor M3 serves as a common node CN to be coupled to the LED units 130a and 130b. The other end of the transistor M3 is coupled to a resistor Rs. Currents of the LED units 130a and 130b flow together through the resistor Rs to generate a current detecting signal Cs. The current regulating controller 350 comprises a controller circuit 352, an OR gate 360 and a protection circuit, wherein the protection circuit comprises an over-voltage comparator 354, an under-voltage comparator 356, and a timer circuit 365. The controller circuit 352 generates a current control signal G1 to regulate a drain-source on resistance of the transistor M3 according to a current detecting signal Cs and a reference voltage signal Vr, thereby stabilizing a sum of the currents of the LED units 130a and 130b at a predetermined current. A voltage detection apparatus 305 comprises two detection units Z1 and Z2, a capacitance Cop and resistors R1, R2, and R3. In the present embodiment, the detection units Z1 and Z2 are zener diodes, whose negative ends are respectively coupled to the energy-storage units Co1 and Co2, and positive ends are coupled with each other. One end of the resistor R2 is coupled to a voltage source Vcc, the other end thereof is coupled to one end of the capacitance Cop, and the other end of the capacitance Cop is grounded. The resistor R3 and the capacitance Cop are connected in parallel. One end of the resistor R1 is coupled to a connection node of the detection units Z1 and Z2, and the other end thereof is coupled to a connection node of the resistor R2 and the capacitance Cop to generate a protection signal Spro.

The over-voltage comparator 354 compares the protection signal Spro with an over-voltage reference voltage Vop, and the under-voltage comparator 356 compares the protection signal Spro with an under-voltage reference voltage Vsh. When the LED units 130a and 130b operate normally, a storing voltage of the energy-storage unit Co1 is lower than a breakdown voltage of the detection unit Z1 and a storing voltage of the energy-storage unit Co2 is lower than a breakdown voltage of the detection unit Z2. At this moment, a level of the protection signal Spro is determined by a voltage dividing ratio of the resistors R2 and R3, and is lower than the over-voltage reference voltage Vop but higher than the under-voltage reference voltage Vsh. Therefore, all the over-voltage comparator 354 and the under-voltage comparator 356 output a low-level signal. When any one of the LED units 130a and 130b operates abnormally (e.g.: open-circuit), a corresponding storing voltage of the energy-storage units Co1, Co2 (i.e., output voltage Vo1 or Vo2) would start to be increased to a value higher than a predetermined over-high protection voltage. When the level of the protection signal Spro is higher than a level of the over-voltage reference voltage Vop, the over-voltage comparator 354 generates a high-level signal. Alternatively, when any one of the LED units 130a and 130b operates abnormally (e.g., short circuit), a corresponding storing voltage of the energy-storage units Co1, Co2 start to be reduced to a value lower than a predetermined over-low protection voltage. When the level of the protection signal Spro is lower than a level of the under-voltage reference voltage Vsh, the under-voltage comparator 354 generates a high-level signal. The timer circuit 365 is coupled to a timing capacitance Ct and set a predetermined time period according to a capacitance value of the timing capacitance Ct. The timer circuit 365 starts to time count when receiving any one of the high-level signals output by the over-voltage comparator 354 and the under-voltage comparator 356 for avoiding erroneous judgment due to the dimming signal DIM or noises. When the over-voltage comparator 354 or the under-voltage comparator 356 generates the high-level signal for a time period longer than the predetermined time period of the timer circuit 365, the timer circuit 365 outputs a stop conduction signal F1. The OR gate 360 is coupled to the timer circuit 365 and receives the dimming signal DIM. The OR gate 360 modulates the current control signal G1 according to the dimming signal DIM for stopping or conducting the currents flowing through the LED units 130a and 130b. When the timer circuit 365 determines that the LED units 130a and 130b operate abnormally and then outputs the stop conduction signal F1, the controller circuit 352 is triggered to execute a protection process, such as: temporarily turning the transistor M3 off until the abnormal condition is removed, turning the transistor M3 off until the current regulating controller 350 is restarted and so on. The timer circuit 365 may output an error notification signal ERR to an external circuit.

The LLC converting controller 200 generates control signals Sc1 and Sc2 to control a power conversion of the resonant circuit 280 according to a feedback signal FB indicative of the voltage of the common node CN to stabilize the voltage of the common node CN at a predetermined voltage. A resonant controller comprises a resonance deviation protection unit 220, a frequency sweeping unit 240 and a logic control unit 250. The frequency sweeping unit 240 generates a clock signal CLK and determines maximum and minimum values of the operating frequency of the clock signal CLK when executing a frequency sweeping process according a frequency resistance RT. The clock signal CLK may have a fixed duty cycle of 50% or less, or an adjustable duty cycle adjusted according to the feedback signal FB. The frequency sweeping unit 240 executes the frequency sweeping process to decrease the operating frequency of the clock signal CLK with time after the LLC converting controller 200 starts. After the frequency sweeping process finishes, the frequency sweeping unit 240 receives the feedback signal FB and accordingly adjusts the operating frequency of the clock signal CLK to stabilize the voltage of the common node CN at the predetermined voltage.

The resonance deviation protection unit 220 detects the current detecting signal Ise in response to a phase of the clock signal CLK and determines that the resonant circuit 280 enters the state of resonance deviation (i.e., entering the region of zero current switching from the region of zero voltage switching) when a level of the current detecting signal Ise is lower than a resonance deviation determination level Vzvs. The resonance deviation protection unit 220 generates a corresponding protection signal according to an indicative signal SSFP representing an operating mode of the LLC converting controller 200 when the resonant circuit 280 enters the state of resonance deviation. The operating modes represented by the indicative signal SSFP have a start-up mode and a normal operating mode. A timing of the start-up mode is a preset period after the resonant controller starting and the frequency sweeping unit 240 starts to execute the frequency sweep process during the period. The start-up mode and the frequency sweeping process may not be end simultaneously. The ends of the start-up mode and the frequency sweeping process depend on the actual applications and it is not affect the function of the LLC converting controller 200 of the present invention. The logic control unit 250 generates the control signals Sc1 and Sc2 according to the clock signal CLK to switch the transistor switches M1 and M2 and control the power conversion of the resonant circuit 280. The logic control unit 250 executes a protection process in response to the protection signal generated by the resonance deviation protection unit 220 to avoid the resonant circuit 280 operating in the region of zero current switching.

The resonance deviation protection unit 220 comprises a falling-edge trigger 202, a D-type flip-flop 204, AND gates 206 and 208, a counter 210, an OR gate 212, a restart protection circuit 214 and a counting latch protection circuit 216. The falling-edge trigger 202 receives the current detecting signal Ise and the resonance deviation determination level Vzvs. The falling-edge trigger 202 generates a high-level signal when the level of the current detecting signal Ise is lower than the resonance deviation determination level Vzvs. For avoiding an erroneous judgment due to switching noise of the transistor switches M1 and M2, the falling-edge trigger 202 may block operating within a preset period after the transistor switch M1 is turned off by receiving the control signal Sc1. An input terminal D of the D-type flip-flop 204 is coupled to an output terminal of the falling-edge trigger 202 and the D-type flip-flop 204 receives the clock signal CLK at a trigger terminal CAR. The D-type flip-flop 204 stops detecting a signal generated by the falling-edge trigger 202 to avoid erroneous judgment when the clock signal CLK is at low level. The D-type flip-flop 204 detects the signal generated by the falling-edge trigger 202 when the clock signal CLK is at high level. The clock signal CLK may be replaced with one of the control signals Sc1 and Sc2 inputted to the D-type flip-flop 204. In general, the phases among the control signals Sc1 and Sc2 and the clock signal CLK may have difference, but these may not influence the determination of resonance deviation. When the clock signal CLK is at high level, the falling-edge trigger 202 outputs a high-level signal and the D-type flip-flop 204 also outputs a high-level signal at an output terminal Q. The AND gates 206 and 208 are coupled to the output terminal Q of the D-type flip-flop 204 and respectively receive the indicative signal SSFP and an inverted indicative signal SSFN, wherein the indicative signal SSFP and the inverted indicative signal SSFN are opposite signals.

The indicative signal SSFP is at high level when the LLC converting controller 200 operates at start-up mode. At this time, the AND gate 206 outputs a high level signal if the D-type flip-flop 204 outputs a high-level signal. Besides, the inverted indicative signal SSFN is at low level, the AND gate 208 is blocked and does not operate. The counter 210 receives the indicative signal SSFP and counts a number of high-level signals generated by the AND gate 206 when the indicative signal SSFP is at high level (i.e., when the LLC converting controller 200 operates at start-up mode). At the start-up mode, the operating frequency of the LLC converting controller 200 is controlled by the frequency sweeping unit 240, and independent of the loading. It may easily result in that the level of the current detecting signal Ise is lower than the resonance deviation determination level Vzvs. For avoiding the foregoing condition being erroneously determined as a resonance deviation, the counter 210 counts the number and generates a high-level signal when the number reaches a preset value. In the present embodiment, the counter 210 may be replaced with a time counter. The time counter determines whether the number reaches the preset value or not within a preset period for better determination result. When the resonant controller 200 enters the normal operating mode from the start-up mode, the indicative signal SSFP is at low level to block the function of the AND gate 206. The inverted indicative signal SSFN is at high level at this time. If the D-type flip-flop 204 outputs the high-level signal, the AND gate 208 also outputs a high-level signal. The OR gate 212 is coupled to the counter 210 and the AND gate 208. When any one of the counter 210 and the AND gate 208 outputs the high-level signal, the OR gate 212 outputs a high-level signal to the restart protection circuit 214. At this time, the restart protection circuit 214 outputs a restart protection signal Ar. The counting latch protection circuit 216 is coupled to the restart protection circuit 214 to count a number of the restart protection signal Ar generated by the restart protection circuit 214. The counting latch protection circuit 216 generates a latch protection signal Latch when the number of the restart protection signal Ar reaches the preset value which is one or an integer greater than one. In the present embodiment, the counting latch protection circuit 216 also receives the indicative signal SSFP to provide different latch protection determinations in response to an operating mode of the LLC converting controller 200, such as the start-up mode or the normal operating mode. For example, the counting latch protection circuit 216 does not execute the latch protection when the LLC converting controller 200 operates at start-up mode; i.e., the counting latch protection circuit 216 does not generate the latch protection signal Latch at the start-up mode. Alternatively, the counting latch protection circuit 216 determines whether generating the latch protection signal Latch or not according to different preset values in response to that the LLC converting controller 200 is at start-up mode or normal operating mode.

The logic control unit 250 executes a restart process when receiving the restart protection signal Ar. First, the LLC converting controller 200 stops generating the control signals Sc1 and Sc2 and so the energy stored in the resonant circuit 280 is decreased. Then, the logic control unit 250 generates a restart signal RE to make the LLC converting controller 200 enter the starting mode again. When the frequency sweeping unit 240 receives the restart signal RE, the frequency sweeping unit 240 re-executes the frequency sweeping process and so the operating frequency of the clock signal CLK is recovered to a higher frequency and then decreased with time. The logic control unit 250 enters a latch protection state to stop outputting the control signals Sc1 and Sc2 when receiving the latch protection signal Latch. Therefore, the resonant circuit 280 is stopped receiving the electric power in the primary side until the LLC converting controller 200 is restarted.

In addition, when the logic control unit 250 receives the error notification signal ERR generated by the current regulating controller 350, the logic control unit 250 stops outputting the control signals Sc1 and Sc2 for avoiding electric shock to users or components damage due to abnormality of the LED units 130a and 130b.

By means of stabilizing the voltage of the common node CN at the predetermined voltage, the present embodiment further reduces a power consumption of the transistor M3 to a lower power consumption value, which almost not varying with the driving voltages of the LED units 130a and 130b. That is, the LED current balance apparatus of the present invention could operate with high efficiency and without effects of the driving voltages of the LED units 130a and 130b varying due to operation temperature increasing and partial LEDs being short circuited. Moreover, all the currents of the LED units 130a and 130b flows through the transistor M3 and so it is hard to determine the individual conditions of the LED units 130a and 130b by the current flowing through the transistor M3, especially when a number of LED units is increased. The voltage detection apparatus 305 of the present invention is coupled to the energy-storage units Co1 and Co2. Therefore, the protection signal Spro is changed only when the storing voltages thereof is over high or over low only due to that the LED units 130a and 130b operate abnormally, thereby avoiding the mentioned-above problem.

The current balancing apparatus disclosed by Samsung which has to consider a balance of the capacitance value of the balancing capacitor and the operating frequency to achieve current balancing. The limitation in selection of the capacitance value and the set precision of the operating frequency significantly affect the stability and equalization of the current. That also seriously pushes the difficulty up in Mass production. In contrast, the current regulating apparatus of the present invention, the selection in capacitance value of the capacitive unit has more flexible and further an equivalence resistance is very large due to one terminal of the LED coupled to the common node CN. Consequently, the present invention provides the current regulating apparatus with high current stability and equalization.

Of course, the current regulating apparatus of the present invention is applicable to other converter circuit having transformer, such as half-bridge converter circuit, full-bridge converter circuit, and push-pull converter circuit.

Compared with the boost converter in the conventional arts, the LED current balance apparatus of the present invention employs the characteristic of the transformer to provide a higher conversion ratio and a request of lower voltage withstanding in transistor switch of the primary side, and so the heat and cost of the system are reduced. Moreover, the present invention uses only one current regulating controller to achieve current balancing two LED units with much lower current ripple, accurate dimming and color-shift free. Furthermore, the voltage detection apparatus of the present invention could provide immediate protection when any one of the LED units operates abnormally.

While the preferred embodiments of the present invention have been set forth for the purpose of disclosure, modifications of the disclosed embodiments of the present invention as well as other embodiments thereof may occur to those skilled in the art. Accordingly, the appended claims are intended to cover all embodiments which do not depart from the spirit and scope of the present invention.

What is claimed is:

1. An LED current balance apparatus, comprising:
    a transformer, having a primary winding and a secondary winding, wherein two terminals of the secondary winding are respectively coupled to an LED unit to drive the LED unit lighting;
    two rectifying energy-storage circuits, respectively coupled to corresponding LED units, wherein every rectifying energy-storage circuit comprises a rectifying unit and an energy-storage unit, the rectifying unit is coupled to a corresponding terminal of the secondary winding for rectifying an electric power supplied by the secondary winding, and the energy-storage unit is coupled to the rectifying unit for storing the rectified electric power;
    at least one capacitive unit, coupled to a corresponding terminal of the secondary winding for storing a bias voltage; and
    a current regulating apparatus, having a common node coupled to the LED units and stabilizing a sum of currents flowing through the LED units at a predetermined current.

2. The LED current balance apparatus according to claim 1, wherein the current regulating apparatus comprises a transistor and a current regulating controller, the transistor is coupled to the LED units, and the current regulating apparatus controls a state of the transistor to stabilize a current flowing through the transistor at the predetermined current.

3. The LED current balance apparatus according to claim 2, further comprising a converting controller and at least one transistor switch, wherein the transistor switch is coupled to the primary winding of the transformer and an input power source, and the converting controller controls a duty cycle of the least one transistor switch according to a voltage of the common node to stabilize the voltage of the common node at a predetermined voltage.

4. The LED current balance apparatus according to claim 2, wherein when a storing voltage of any one of the energy storage units is higher than a predetermined over-high protection voltage, the current regulating controller executes at least one protection process mentioned below:
    a. turning off the transistor; and
    b. outputting an error notification signal to an external circuit.

5. The LED current balance apparatus according to claim 4, further comprising a voltage detection apparatus, wherein the voltage detection apparatus comprises two detection units, one end of every detection unit is coupled to a corresponding energy-storage unit and the other end thereof is coupled with each other as well as the current regulating apparatus, and every detection unit triggers the current regulating controller to executes the least one protection process when the storing voltage of the corresponding energy-storage unit is higher than the predetermined over-high protection voltage.

6. The LED current balance apparatus according to claim 2, wherein when a storing voltage of any one of the energy storage units is lower than a predetermined over-low protection voltage, the current regulating controller executes at least one protection process mentioned below:
    a. turning off the transistor; and
    b. outputting an error notification signal to an external circuit.

7. The LED current balance apparatus according to claim 6, further comprising a voltage detection apparatus, wherein the voltage detection apparatus comprises two detection units, one end of every detection unit is coupled to a corresponding energy-storage unit and the other end thereof is coupled with each other as well as the current regulating apparatus, and every detection unit triggers the current regulating controller to executes the least one protection process when the storing voltage of the corresponding energy-storage unit is lower than the predetermined over-low protection voltage.

8. The LED current balance apparatus according to claim 2, wherein the current regulating controller controls the transistor to be turned on and off according to a dimming signal thereby stabilizing the current flowing through the transistor at the predetermined current when the transistor is turned on and at zero when the transistor is turned off.

9. The LED current balance apparatus according to claim 8, further comprising a converting controller and at least one transistor switch, wherein the transistor switch is coupled to the primary winding of the transformer and an input power source, and the converting controller controls a duty cycle of the least one transistor switch according to a voltage of the common node to stabilize the voltage of the common node at a predetermined voltage.

10. The LED current balance apparatus according to claim 8, wherein when any one of a storing voltage of any one of the energy storage units is higher than a predetermined over-high protection voltage, the current regulating controller executes at least one protection process mentioned below:
    a. turning off the transistor; and
    b. outputting an error notification signal to an external circuit.

11. The LED current balance apparatus according to claim 10, further comprising a voltage detection apparatus, wherein the voltage detection apparatus comprises two detection units, one end of every detection unit is coupled to a corresponding energy-storage unit and the other end thereof is coupled with each other as well as the current regulating apparatus, and every detection unit triggers the current regulating controller to executes the least one protection process when the storing voltage of the corresponding energy-storage unit is higher than the predetermined over-high protection voltage.

12. The LED current balance apparatus according to claim 8, wherein when any one of a storing voltage of any one of the energy storage units is lower than a predetermined over-low protection voltage, the current regulating controller executes at least one protection process mentioned below:
    a. turning off the transistor; and
    b. outputting an error notification signal to an external circuit.

13. The LED current balance apparatus according to claim 12, further comprising a voltage detection apparatus, wherein the voltage detection apparatus comprises two detection units, one end of every detection unit is coupled to a corresponding energy-storage unit and the other end thereof is coupled with each other as well as the current regulating apparatus, and every detection unit triggers the current regulating controller to executes the least one protection process when the storing voltage of the corresponding energy-storage unit is lower than the predetermined over-low protection voltage.

14. The LED current balance apparatus according to claim 3, wherein the converting controller is an LLC converting controller, which executes a frequency-sweeping process to decrease an operating frequency with time under a start-up mode and modulates the operating frequency according to the voltage of the common node under a normal operating mode.

* * * * *